United States Patent [19]
Boekkooi

[11] 3,828,407
[45] Aug. 13, 1974

[54] METHOD OF MANUFACTURING ELECTRIC LAMPS

[75] Inventor: Anton Boekkooi, Emmasingel, Eindhoven, Netherlands

[73] Assignee: U.S. Philips Corporation, New York, N.Y.

[22] Filed: Sept. 14, 1972

[21] Appl. No.: 288,920

[30] Foreign Application Priority Data
Sept. 17, 1971  Netherlands......................... 7112769

[52] U.S. Cl.................... 29/25.11, 65/34, 316/1, 316/17
[51] Int. Cl............................................. H01j 9/00
[58] Field of Search ............ 29/25.13, 25.11; 316/1, 316/17, 18, 20, 21, 24; 220/2.2; 313/110, 315; 65/34, 36, 43, 102, 155

[56] References Cited
UNITED STATES PATENTS
| | | | |
|---|---|---|---|
| 3,120,433 | 2/1964 | Van Zee | 65/43 |
| 3,551,725 | 12/1970 | Brundige | 316/19 |
| 3,636,398 | 1/1972 | Boyce | 313/318 |

FOREIGN PATENTS OR APPLICATIONS
777,140   6/1957   Great Britain......................... 65/34

*Primary Examiner*—Roy Lake
*Assistant Examiner*—James W. Davie
*Attorney, Agent, or Firm*—Frank R. Trifari

[57] ABSTRACT

In the manufacture of incandescent lamps, discharge lamps and the like, glass parts are coated with a radiation absorbing pigmented lacquer which are softened or sealed by means of irradiation by light.

5 Claims, 1 Drawing Figure

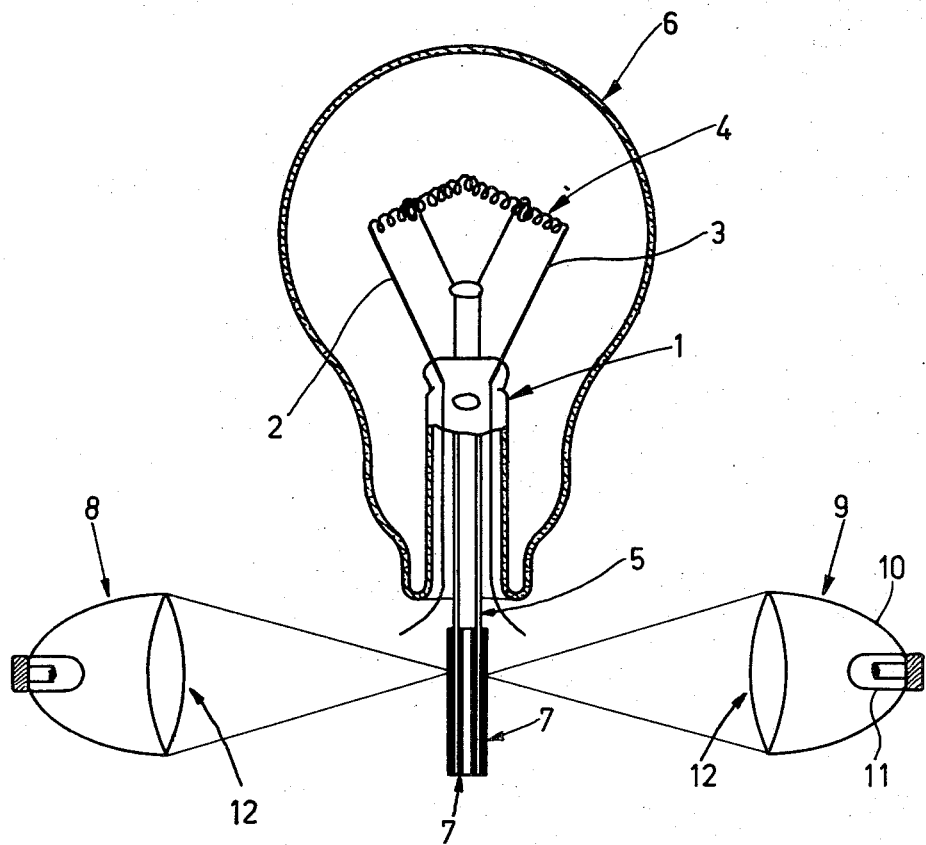

METHOD OF MANUFACTURING ELECTRIC LAMPS

The invention relates to a method of manufacturing electric lamps such as incandescent lamps and discharge lamps in which one of the stages consists of a local heat treatment by irradiating a radiation-absorbing glass part, particularly a cylindrical glass part and by subsequently deforming and/or sealing this glass part to a further part consisting or not consisting of glass.

The method according to the invention also relates to deforming and fusing cylindrical glass parts such as exhaust tubes and the like in electric lamps.

A method is known in which the heat required for the heat treatment is obtained by means of a radiation source and in which glass coloured throughout is used which absorbs the incident radiation.

This method is, however, only usable to a limited extent, namely in those cases where coloured glass is acceptable and in which the coefficient of expansion, the thermal conductivity and the softening point of the coloured glass and the non-coloured glass forming the parts to be sealed can be adapted to one another. If this is not possible, a fused joint is obtained in which stresses are present which may give rise to breakage in the fused joint. Another drawback is that the entire part to be sealed is to consist of coloured glass.

According to a method likewise known, one of the parts of glass to be sealed is locally provided with a layer of a material absorbing radiation from a radiation source used for the heat treatment. The only material mentioned in this connection is graphite.

However, graphite has the drawback that it burns in air at temperatures of more than approximately 450°C and reacts with water vapour and carbon dioxide at temperatures of more than approximately 800°C.

Graphite and generally carbon have the further drawback in this respect that they cannot generally be used within the space enclosed by the envelope. This is, for example, the case in most incandescent lamps which are provided with a tungsten filament. In the presence of carbon within the envelope there is a great risk that tungsten carbides may be formed during use, which carbides are brittle and may give rise to breakage of the filament.

The invention has for its object to provide a method in which the drawbacks of the known methods can be obviated.

The method according to the invention is characterized in that glass parts are used which have been adapted to absorb radiation by coating them at the area to be heated with a layer of a lacquer comprising a radiation-absorbing metal oxide or metal and a synthetic material as a binder which upon heating becomes volatile without leaving traces. If the lacquer layer is used within the envelope space, it is preferred to use those metal oxides and metals which either do not react with these metal parts or, if a reaction takes place, do not influence the mechanical properties in a manner which is detrimental to the lifetime of the lamp.

Metal oxides which may be used in this connection are, for example, the oxides of copper, nickel, tantalum, tungsten, molybdenum, cobalt, chromium, manganese and zirconium.

Metals in a colloidal form such as silver and platinum may be used.

These materials may be used in lamps having tungsten parts such as incandescent lamps having a tungsten filament without a risk of the mechanical strength of these parts being detrimentally influenced during use.

A synthetic material is used as a binder which upon heating becomes volatile as such or becomes volatile while decomposing without leaving any traces. Synthetic materials which may be used for this purpose are, for example, polymethylacrylate, polymethylmethacrylate, polystyrene.

A lacquer suitable for providing a radiation-absorbing layer may be obtained, for example, as follows: A solution in xylene is prepared of polymethylmethacrylate resin which comprises 25 percent by weight of polymethylmethacrylate resin. A metal oxide powder or metal powder is dispersed in this solution until a paste-like lacquer is obtained.

The lacquer is preferably not only provided on the surface of the glass part to be heated and directly irradiated by the radiation source but also on the surface part of the glass part which in case of radiation is in the shade of the first-mentioned surface.

In fact, it was found that in this manner the desired temperature is much faster achieved in case of radiation than when not using this step.

In many cases, particularly in cylindrical glass parts to be heated such as exhaust tubes the lacquer may therefore be provided in a simple manner by immersion. The cylindrical objects are then coated with a lacquer on the inner side and on the outer side.

Radiation sources may be, for example, infrared radiators, halogen projection lamps and the like.

The method according to the invention will be described in greater detail with reference to the accompanying drawing and the following embodiment.

In the drawing the sole FIGURE diagrammatically shows the heat treatment of an exhaust tube of an incandescent lamp.

The FIGURE shows a state in the manufacture of an incandescent lamp in which the stem 1 with the current conductors 2 and 3, the filament 4 and the exhaust tube 5 are already mounted in the envelope 6. A lacquer layer 7 is provided on the inside and the outside of the exhaust tube 5 by immersing the exhaust tube in a lacquer paste which is obtained by dispersing 25 grams of cuprous oxide ($Cu_2O$) in 75 grams of a 25 percent by weight solution of polymethyl methacrylate in xylene. After immersion the lacquer layer is dried in air for several minutes. Subsequently the part of the exhaust tube to be heated is placed in the beam of a radiation source. The FIGURE shows diagrammatically two radiation sources 8 and 9 each comprising a reflector 10 and a halogen incandescent lamp 11 and a lens 12 for concentrating the beam on the surface to be irradiated. In case of irradiation the temperature of the irradiated surface increases. At approximately 300°C the binder is decomposed and disappears without leaving any residues. The vapours released are exhausted. Subsequently the lamp is filled with a filler gas or is brought to the desired vacuum. At the instant when the softening point of the glass is reached, the exhaust tube is pinched and the lamp is ready but for the provision of the base.

The method according to the invention provides the following advantages: the light-absorbing layer may be provided very locally. The metal oxides and metals which can be used as light-absorbing materials influence the properties of glass to a slight extent only in spite of the fact that in the method according to the invention the greater part of these materials disappear in the glass.

I claim:

1. In a method for the manufacture of an electric lamp, the process comprising the steps of:

fabricating a glass envelope having an open neck portion and a body portion, said glass being deformable at a predetermined temperature;

coating said neck portion of said glass with a lacquer layer comprising a radiation-absorbing substance selected from the group comprising metal oxide and metal and a synthetic binding material, which coating upon heating to said glass deforming predetermined temperature, becomes volatile without leaving traces;

irradiating said radiation-absorbing coated glass part so as to locally heat it until said neck portion at said coated area is raised to said predetermined temperature; and deforming said neck portion to a predetermined contour.

2. A method as claimed in claim 1, wherein said substance does not detrimentally influence the mechanical properties of metal parts in the lamp.

3. A method as claimed in claim 1, wherein said substance is selected from the group consisting of the oxides of copper, nickel, tantalum, tungsten, molybdenum, cobalt, chromium, manganese and zirconium and metallic silver and platinum.

4. A method as claimed in claim 1, wherein both the surface on which radiation is directly incident and the surface being located in the shade of said first surface upon radiation is coated with a light-absorbing lacquer layer.

5. A method as claimed in claim 1, wherein the cylindrical glass parts which must be heated by irradiation are coated on the inside and the outside with a radiation-absorbing lacquer layer.

* * * * *